(12) United States Patent
Park

(10) Patent No.: US 10,567,622 B2
(45) Date of Patent: Feb. 18, 2020

(54) CAMERA ASSEMBLY AND METHOD OF INSTALLING THE SAME

(71) Applicant: Hanwha Techwin Co., Ltd., Seongnam-si (KR)

(72) Inventor: Moon Hee Park, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 17 days.

(21) Appl. No.: 16/001,033

(22) Filed: Jun. 6, 2018

(65) Prior Publication Data
US 2019/0191059 A1 Jun. 20, 2019

(30) Foreign Application Priority Data

Dec. 19, 2017 (KR) .......................... 10-2017-0175341

(51) Int. Cl.
| | | |
|---|---|---|
| *H04N 7/18* | (2006.01) | |
| *H04N 5/225* | (2006.01) | |
| *H04N 7/56* | (2006.01) | |
| *G08B 13/196* | (2006.01) | |
| *H04N 5/247* | (2006.01) | |
| *G03B 17/56* | (2006.01) | |

(52) U.S. Cl.
CPC ......... *H04N 5/2251* (2013.01); *G03B 17/561* (2013.01); *G08B 13/19617* (2013.01); *H04N 5/247* (2013.01); *H04N 7/181* (2013.01); *H04N 7/183* (2013.01)

(58) Field of Classification Search
None
See application file for complete search history.

(56) References Cited

U.S. PATENT DOCUMENTS

| | | |
|---|---|---|
| 9,429,792 B2 | 8/2016 | Jia et al. |
| 9,438,782 B2 | 9/2016 | Donaldson |
| 2009/0196597 A1* | 8/2009 | Messinger ............. F16M 11/14 396/427 |
| 2015/0177596 A1 | 6/2015 | Bergsten et al. |
| 2017/0139309 A1* | 5/2017 | Axelsson ............... G03B 17/02 |

FOREIGN PATENT DOCUMENTS

| | | |
|---|---|---|
| KR | 10-2008-0048260 A | 6/2008 |
| KR | 10-1612877 B1 | 4/2016 |
| KR | 10-1763845 B1 | 8/2017 |
| KR | 10-2017-0109903 A | 10/2017 |

\* cited by examiner

Primary Examiner — Mark T Monk
(74) Attorney, Agent, or Firm — Sughrue Mion, PLLC

(57) ABSTRACT

Provided are a camera assembly and a method of installing the camera assembly. The camera assembly includes: a base portion; a guide rail mounted on a surface of the base portion; a magnet arranged to face the guide rail; a camera lens units arranged to be moveable on or along the guide rail; and a cover configured to fix positions of the camera lens units to the guide rail by pushing at least one of the plurality of camera lens units.

19 Claims, 8 Drawing Sheets

CAMERA ASSEMBLY AND METHOD OF INSTALLING THE SAME

CROSS-REFERENCE TO THE RELATED APPLICATION

This application claims priority from Korean Patent Application No. 10-2017-0175341, filed on Dec. 19, 2017, in the Korean Intellectual Property Office, the disclosure of which is incorporated herein in its entirety by reference.

BACKGROUND

1. Field

Apparatuses and methods consistent with exemplary embodiments relate to a camera assembly and a method of installing the same, and more particularly, to a surveillance camera assembly and a method of installing the same.

2. Description of the Related Art

A surveillance camera device installed on a wall surface of a building or a ceiling may be used to collect video records to improve safety, security, and service. In general, in a process of assembling a surveillance camera device, a rotary angle of a camera is set, and the camera is fixed within the set rotary angle. Recently, research has been conducted into a method of fixing the rotary angle of the camera by coupling a cover portion covering a camera unit to a base portion by screw-coupling.

However, during a screw-assembling process in which the cover portion is rotated relative to the base portion, the camera may rotate along with the cover portion, and a setting angle of the camera may be changed. The above change in the camera angle becomes severe when a product size of the camera device increases.

Also, workmanship of the assembling operation may degrade because the assembling operation of the cover portion with respect to the base portion is mostly performed manually and because the camera device has a narrow space making it difficult to ensure a sufficient working space for rotating manipulation.

Korean Laid-open Patent No. 10-2017-0109903 discloses a surveillance camera assembling structure of a dome type. However, a dome cover is coupled by using a screw, etc., and additionally, alignment may be twisted during the assembling process.

SUMMARY

One or more exemplary embodiments of the inventive concept provide a camera assembly having an improved convenience of installation, and a method of installing the camera assembly.

Various aspects of the inventive concept will be set forth in part in the description which follows and, in part, will be apparent from the description, or may be learned by practice of the presented embodiments.

According to one or more exemplary embodiments, a surveillance camera assembly includes: a base portion; a guide rail mounted on the base portion; a plurality of camera lens units arranged to be movable on or along the guide rail, each of the camera lens units comprising a magnet arranged to face the guide rail; and a cover configured to fix positions of the camera lens units to the guide rail by pushing at least one of the camera lens units.

When the positions of the camera lens units are fixed on the guide rail, the magnet may be spaced apart from a surface of the guide rail and the magnet may not contact the guide rail.

The magnet may generate attractive force of a degree to allow each of the camera lens units to move on or along the guide rail when an external force is applied to the camera lens unit, and a position of the camera lens unit may be fixed when the cover is assembled with the base portion.

The camera assembly may further include a fixing member arranged between at least one of the camera lens units and the cover.

The fixing member may be attached to each of the camera lens units, the fixing member including a cushion.

When the cover is assembled with the base portion, the fixing member may be tightly positioned between the cover and the camera lens unit.

The fixing member may inwardly protrude from the cover to be inserted to the camera lens unit.

The magnet and the guide rail may be arranged in a first direction that is a center axis direction of the base portion to generate attractive force in the first direction, and the cover may push the fixing member in the first direction.

Each of the camera lens units may include: a lens module; a connector configured to allow the lens module to tilt and including the magnet; and a guide hook arranged on an outer portion of the connector to surround the guide rail.

The camera assembly may further include a fixing member arranged on the lens module, the connector, or a first lens cover surrounding the lens module.

The magnet may be provided to be depressed in a surface of the connector.

The camera lens units may include: a first camera unit arranged on or along the guide rail to have a field of view in a radial direction of a center axis of the base portion; and a second camera unit arranged to have a field of view in a direction aligned or parallel with the center axis of the base portion, wherein one of the first camera unit and the second camera unit may be replaceable by the other.

According to one or more embodiments, a surveillance camera assembly includes: a base portion; a guide rail mounted on the base portion; a camera lens unit arranged to be moveable on or along the guide rail; a magnet provided in the camera lens unit to maintain a predetermined interval between the magnet and a surface of the guide rail; and a cover coupled to the base portion and surrounding the camera lens unit.

The cover may be configured to fix a position of the camera lens unit to the guide rail by pushing a side of the camera lens unit.

The surveillance camera assembly may further include a fixing member arranged between the cover and the camera lens unit.

The magnet may generate attractive force of a degree to allow the camera lens unit to move on or along the guide rail when an external force is applied to the camera lens unit, and a position of the camera lens unit may be fixed when the cover is assembled with the base portion.

The surveillance camera assembly may further include a guide hook arranged in the camera lens unit to surround the guide rail.

According to one or more embodiments, a method of installing a surveillance camera assembly, the method includes: installing a base portion including a guide rail; attaching a plurality of camera lens units, each having a magnet attached to thereof, to the guide rail; aligning positions of the plurality of camera lens units by moving each of the camera lens units on or along the guide rail; and fixing the positions of the camera lens units by coupling the cover to the base portion.

In the aligning the positions of the camera lens units, the magnet and the guide rail may generate attractive force therebetween to allow the camera lens unit to move on or along the guide rail when an external force is applied to at least one of the camera lens units.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION

Figure 1:
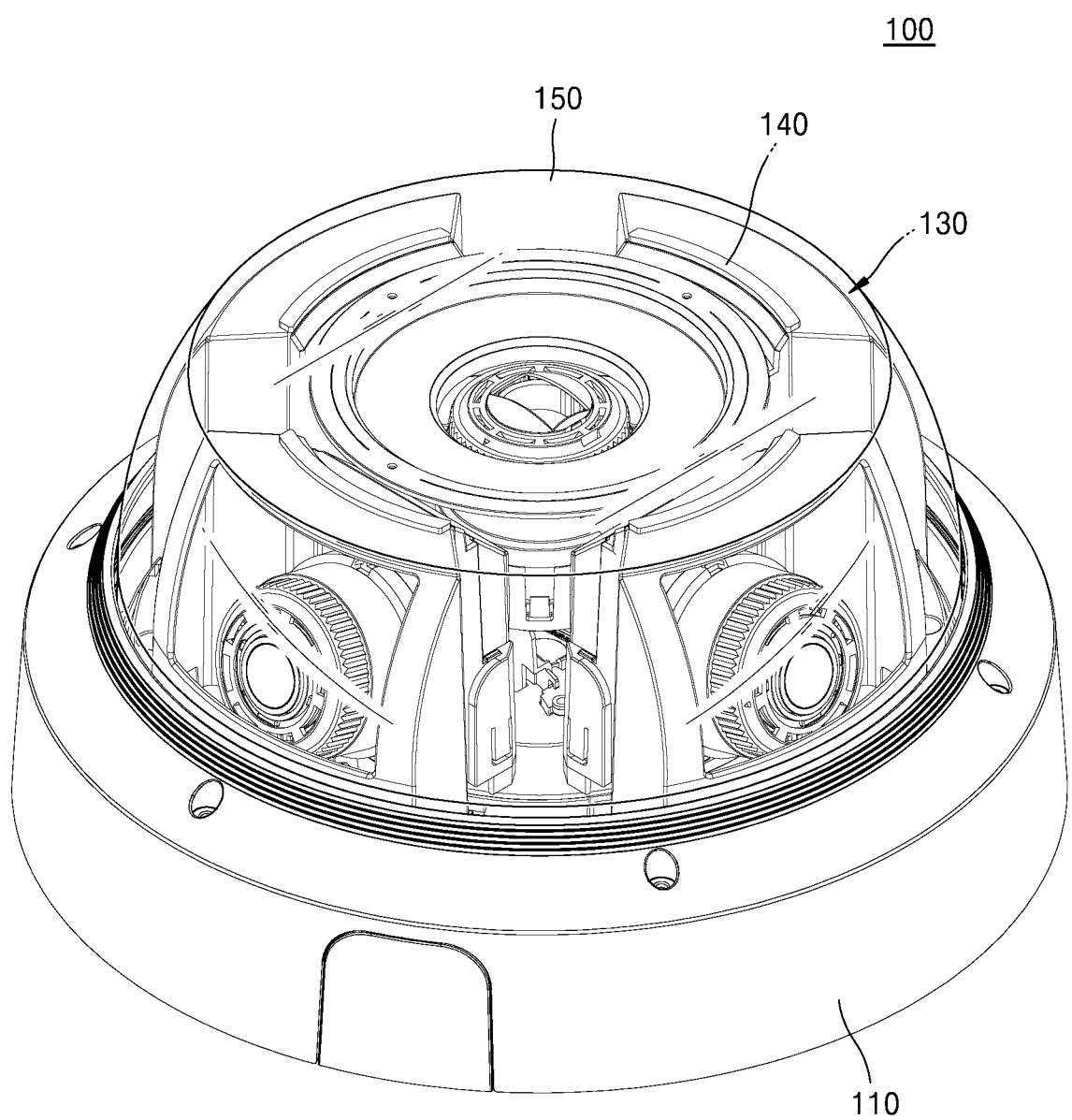
FIG. 1 is a perspective view of a surveillance camera assembly according to an exemplary embodiment.

Reference will now be made in detail to exemplary embodiments, examples of which are illustrated in the accompanying drawings, wherein like reference numerals refer to like elements throughout. In this regard, the present embodiments may have different forms and should not be construed as being limited to the descriptions set forth herein. Accordingly, these embodiments are merely described below, by referring to the figures, to explain various aspects of the inventive concept. The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises," "comprising," "includes," and/or "including," when used herein, do not preclude the presence or addition of one or more other elements. It will be understood that although the terms "first" and "second" are used herein to describe various elements, these elements should not be limited by these terms. Terms are only used to distinguish one element from other elements.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout. As used herein, the term "and/or" includes any and all combinations of one or more of the associated listed items.

Spatially relative terms, such as "beneath," "below," "lower," "over," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Figure 2:
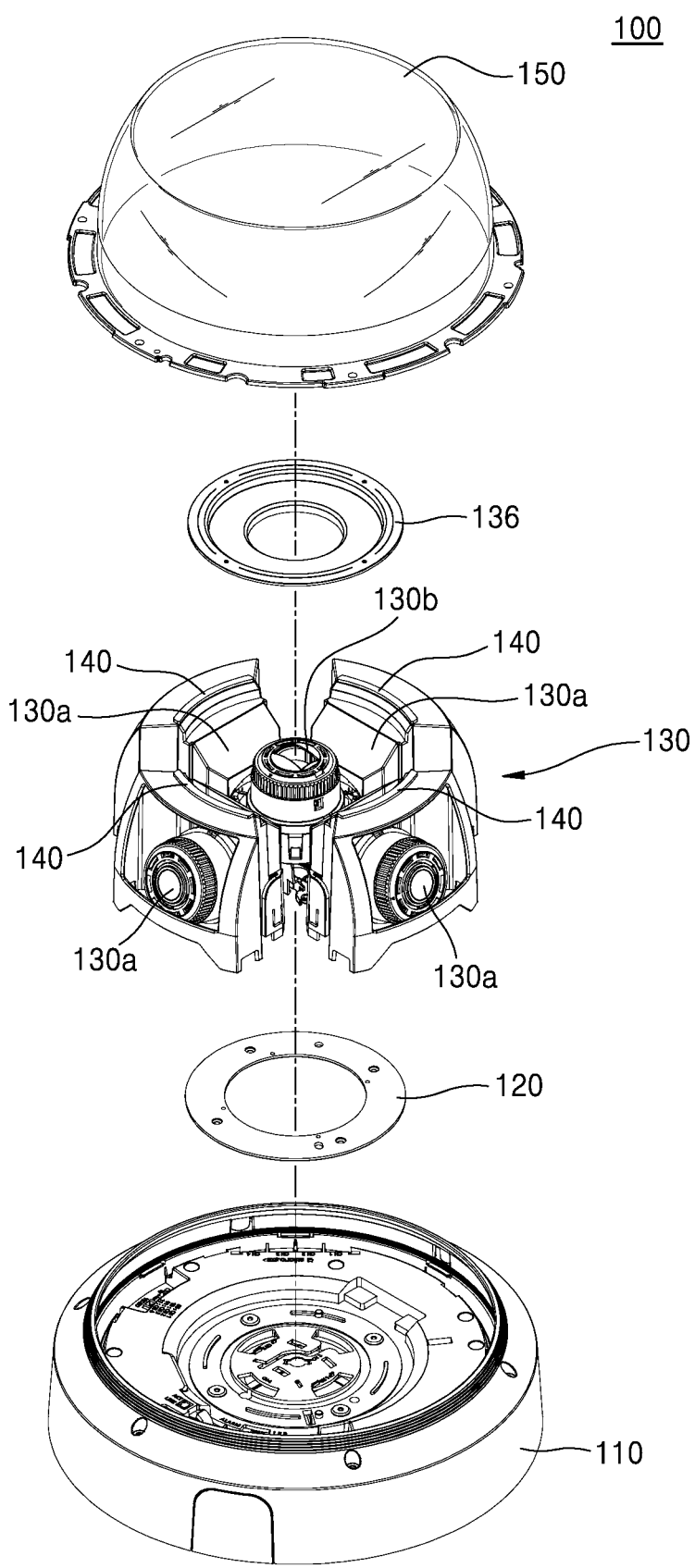
FIG. 2 is an exploded perspective view of the surveillance camera assembly of FIG. 1, according to an exemplary embodiment.

FIG. 1 is a perspective view of a surveillance camera assembly 100 according to an exemplary embodiment, and FIG. 2 is an exploded perspective view of the surveillance camera assembly 100 of FIG. 1 according to an exemplary embodiment.

Referring to FIGS. 1 and 2, the surveillance camera assembly 100 includes a base portion 110, a guide rail 120, a camera lens set 130, a fixing member 140, and a cover 150.

The camera lens set 130 may include a plurality of camera lens units to capture images simultaneously from various angles. Since each of the camera lens units 130 has to be installed to ensure an appropriate field of view, locations of the camera lens units have to be set according to an installation location of the surveillance camera assembly 100. For example, if there is a blind spot because of an obstacle, locations of the camera lens units may be adjusted not to photograph the blind spot, or one or more of the camera lens units may be removed. Therefore, the location of the surveillance camera assembly 100 including the camera lens set 130 including the camera lens units has to be adjusted taking into account an installation environment.

The base portion 110 may be provided at an external environment to support the camera lens set 130. The base portion 110 may have a cylindrical shape or a disc shape. However, the shape the base portion 110 is not limited thereto, and may have various shapes, e.g., a polygonal pillar shape, a polygonal plate shape, etc. The base portion 110 may include a circuit board, a controller, a battery, etc. therein.

The guide rail 120 may be provided on one surface of the base portion 110. The guide rail 120 may be fixedly installed on the base portion 110. Since at least one of the camera lens units may be moved on or along the guide rail 120, the guide rail 120 is provided to adjust locations of the cameras.

The guide rail 120 may have a circular loop plate shape, according to the base portion 110. Alternately, the guide rail 120 may have a polygonal loop plate shape, along with an outer portion of the base portion 110. Since the camera lens units are arranged on the guide rail 120 and a lens of each of the camera lens units has to have a view to the outside, the guide rail 120 may be formed along an outer side of the base portion 110.

The guide rail 120 may include a ferromagnetic material. The guide rail 120 and a magnet 134 (refer to FIG. 4) generate attractive force therebetween to attach or align the camera lens units.

At least one of the camera lens units may include the magnet 134 that is arranged facing the guide rail 120, and may be moveable along the guide rail 120. The camera lens units may include at least one first camera lens unit 130a arranged on the guide rail 120 and a second camera lens unit 130b arranged at a center of the first camera lens unit 130a when the first camera lens unit 130a is two or more. According to the present embodiment, only the first camera lens units 130a may be arranged on the guide rail 120 while the second camera lens unit 130b is not.

The first camera lens unit 130a may have a field of view in a radial direction from a center axis of the base portion 110. Since the first camera lens units 130a are arranged along the guide rail 120, photographing may be performed in various angles. FIGS. 1 and 2 show four first camera lens units 130a, but the inventive concept is not limited thereto, and at least one first camera lens unit 130a may be provided.

The second camera lens unit 130b may be arranged at a center axis of the base portion 110 so that an optical axis of the second camera lens unit 130b is aligned or parallel with the center axis of the base portion 110. The second camera lens unit 130b may have a field of view in a center axis direction of the surveillance camera assembly 100. A second lens cover 136 is provided on an upper portion of the second camera lens unit 130b to reduce distortion of a captured image.

One of the first camera lens unit 130a and the second camera lens unit 130b may be replaceable by the other. That is, the locations of the first and second camera lens units 130a and 130b may be switched. In a case where the first camera lens unit 130a or the second camera lens unit 130b breaks, the first camera lens unit 130a may be replaced with the second camera lens unit 130b or the second camera lens unit 130b may be replaced with the first camera lens unit 130a temporarily.

The fixing member 140 may be arranged between the cover 150 and at least one of the first camera lens units 130a. The fixing member 140 may be provided at a portion where the cover 150 pushes the outer portion of the camera lens set 130. The fixing member 140 contacts the cover 150 to fix the camera lens set 130 at a certain position, and thus, the first camera lens units 130a may not move along the guide rail 120 once the locations of the first camera lens units 130a are fixed on the guide rail 120.

For example, the fixing member 140 may include a cushion, and when the cover 150 is installed on the base portion 110, an inner circumferential surface of the cover 150 presses the fixing member 140 to fix the camera lens set 130. When the cover 150 is installed on the base portion 110, the fixing member 140 may be tightly inserted between the cover 150 and the camera lens set 130.

As another example, the fixing member 140 may include a member having an adhesive force. Also, the fixing member 140 may be a protrusion type, a groove type, or a hole type to perform an alignment function and a fixing function at the same time.

In the drawings, the fixing member 140 is provided at an outer portion of a first lens cover 135 (refer to FIG. 5), but the inventive concept is not limited thereto. The fixing member 140 may be provided at various locations, provided that the fixing member 140 fixes the location of the camera lens set 130 in contact with the cover 150. For example, the fixing member 140 may be provided directly at an outer side surface of a lens module 131 (refer to FIG. 3) without installing the first lens cover 135. Also, the fixing member 140 may be provided at a side of a connector 132 (refer to FIG. 3) that the lens module 131.

The cover 150 is mounted on the base portion 110 to surround the camera lens set 130. The cover 150 may fix the locations of the first camera lens units 130a on the guide rail 120 by pressurizing parts of the camera lens set 130.

The cover 150 may have various shapes, e.g., a hemispherical shape, a dome shape, etc. As an example, as shown in FIG. 1, a front surface of the cover 150 may be flat, and a side surface of the cover 150 may be curved. The cover 150 may be at least partially transparent, and thus, the camera lens set 130 may obtain a captured image.

Hereinafter, "attaching" or "aligning" the first camera lens unit 130a denotes that the first camera lens unit 130a is placed on the guide rail 120 by a magnetic force of the magnet 134, and thus, when a user applies an external force to the first camera lens unit 130a, the first camera lens unit 130a may freely move along the guide rail 120.

Also, "fixing" the first camera lens unit 130a may denote that the cover 150 pushes the first camera lens unit 130a to fix the camera lens unit 130a on a certain location of the guide rail 120 so that the first camera lens unit 130a does not move along the guide rail 120.

Figure 3:
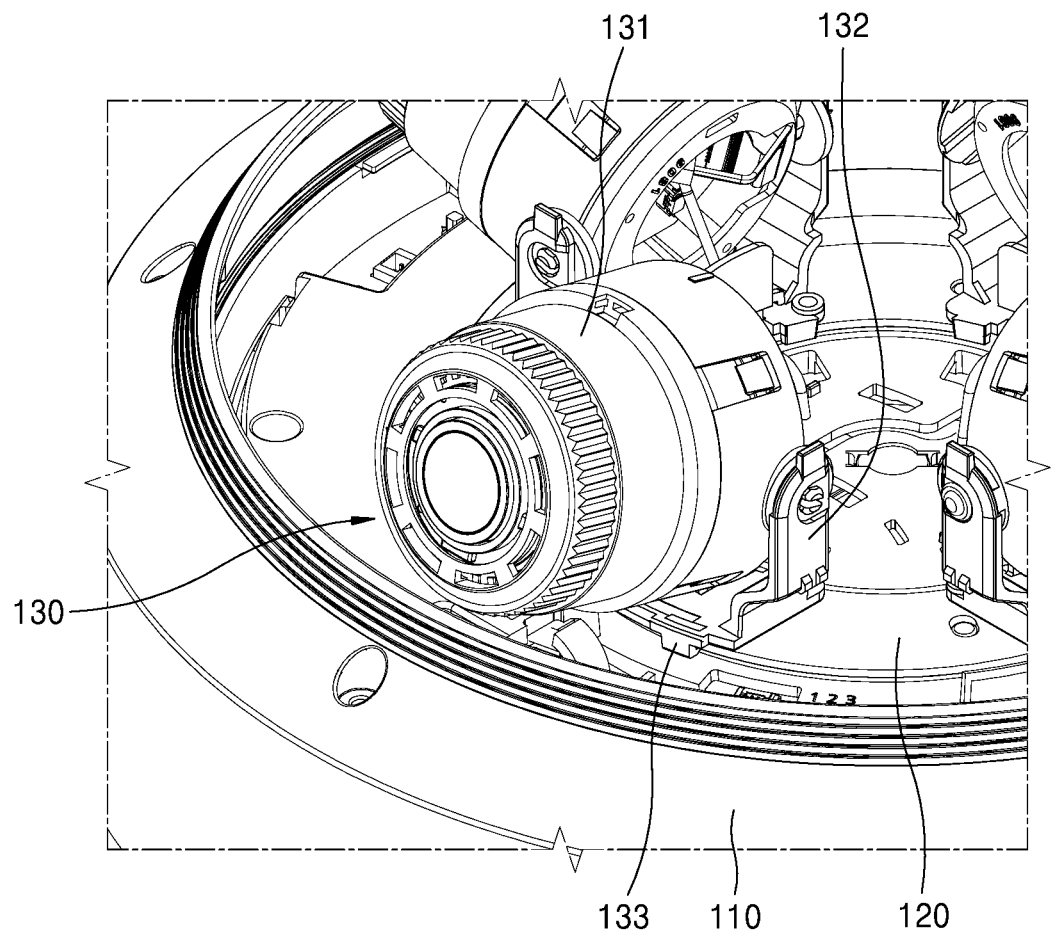
FIG. 3 is a diagram showing some components of the surveillance camera assembly of FIG. 1, according to an exemplary embodiment.
Figure 4:
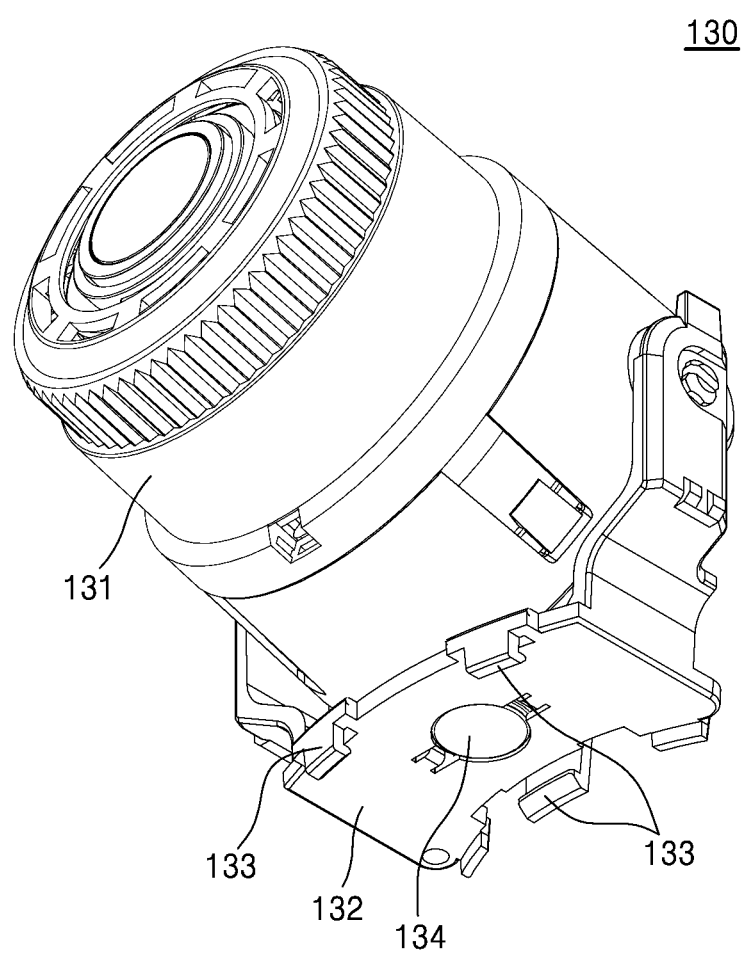
FIG. 4 is a rear perspective view of a camera module of FIG. 1, according to an exemplary embodiment.

FIG. 3 is a diagram showing some components of the surveillance camera assembly 100 of FIG. 1, and FIG. 4 is a rear perspective view of the camera lens set 130 of FIG. 1, according to exemplary embodiments.

Referring to FIGS. 3 and 4, the camera lens set 130 may include the first camera lens unit 130a and the second camera lens unit 130b (not shown). The first camera unit 130a and the second camera unit 130b (not shown) are the same as or similar to each other, and thus, hereinafter the first camera unit 130a will be described in detail for convenience of description.

Figure 5:
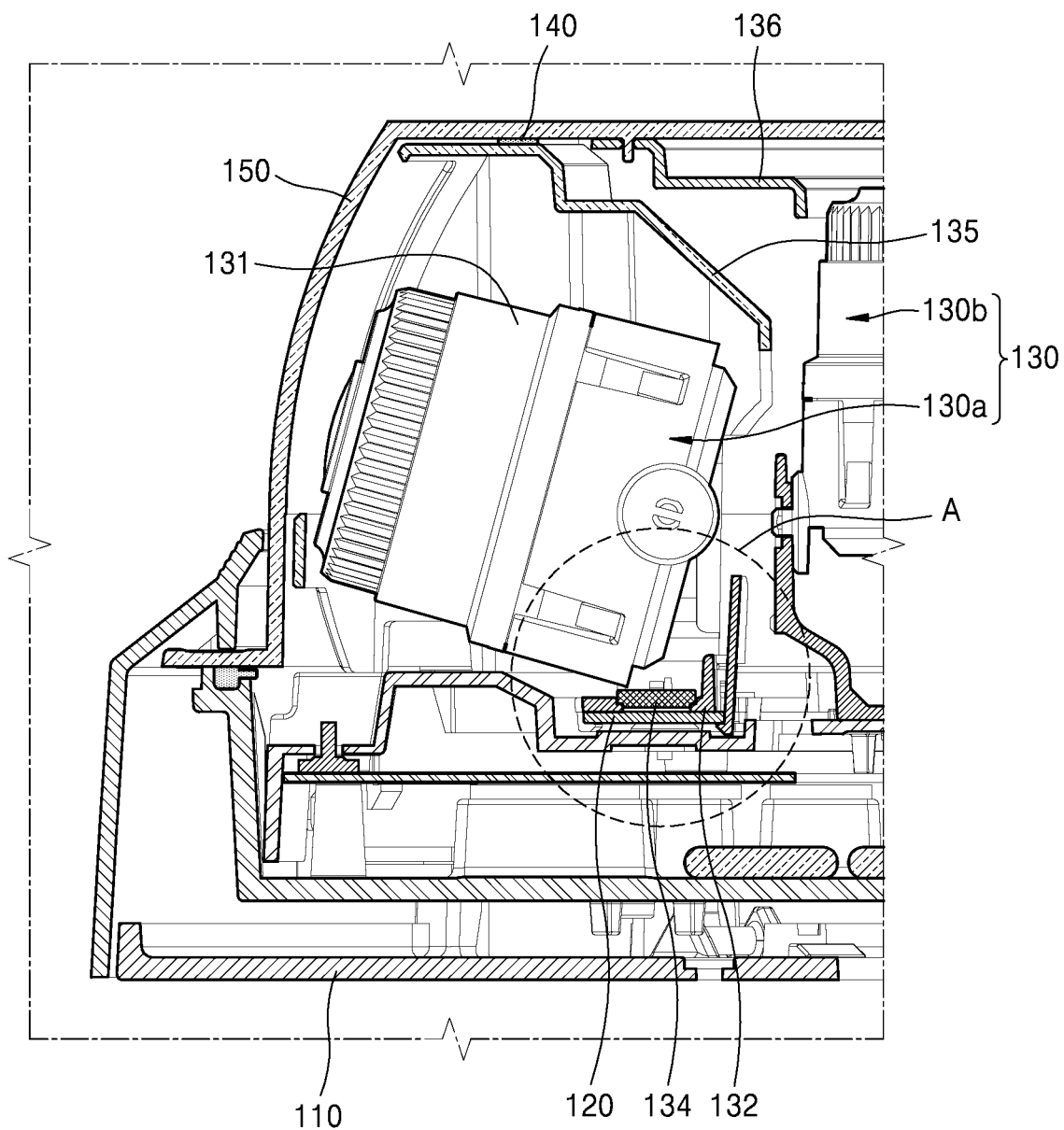
FIG. 5 is a cross-sectional view of the surveillance camera assembly of FIG. 1, according to an exemplary embodiment.

The first camera lens unit 130a may include the lens module 131, the connector 132, a guide hook 133, the magnet 134, and the first lens cover 135 of FIG. 5.

The lens module 131 may include an optical lens to capture an image. An external housing of the lens module 131 is rotatably connected to the connector 132. Thus, a photographing view of the lens module 131 may be adjusted by the connector 132 in a tilting direction.

The connector 132 may attach the lens module 131 to the guide rail 120. The lens module 131 is rotatably provided at a side of the connector 132, and the magnet 134 is arranged in the connector 132 to attach the lens module 131 to the guide rail 120.

The magnet 134 may be arranged in the connector 132. The magnet 134 is arranged facing the guide rail 120 to have attractive force with respect to the guide rail 120.

In FIG. 4, the magnet 134 is arranged at a center in the connector 132, but the inventive concept is not limited thereto. For example, a plurality of magnets 134 may be arranged at a plurality of locations in the connector 132. Also, the magnet 134 may be arranged at opposite ends of the connector 132.

Figure 6:
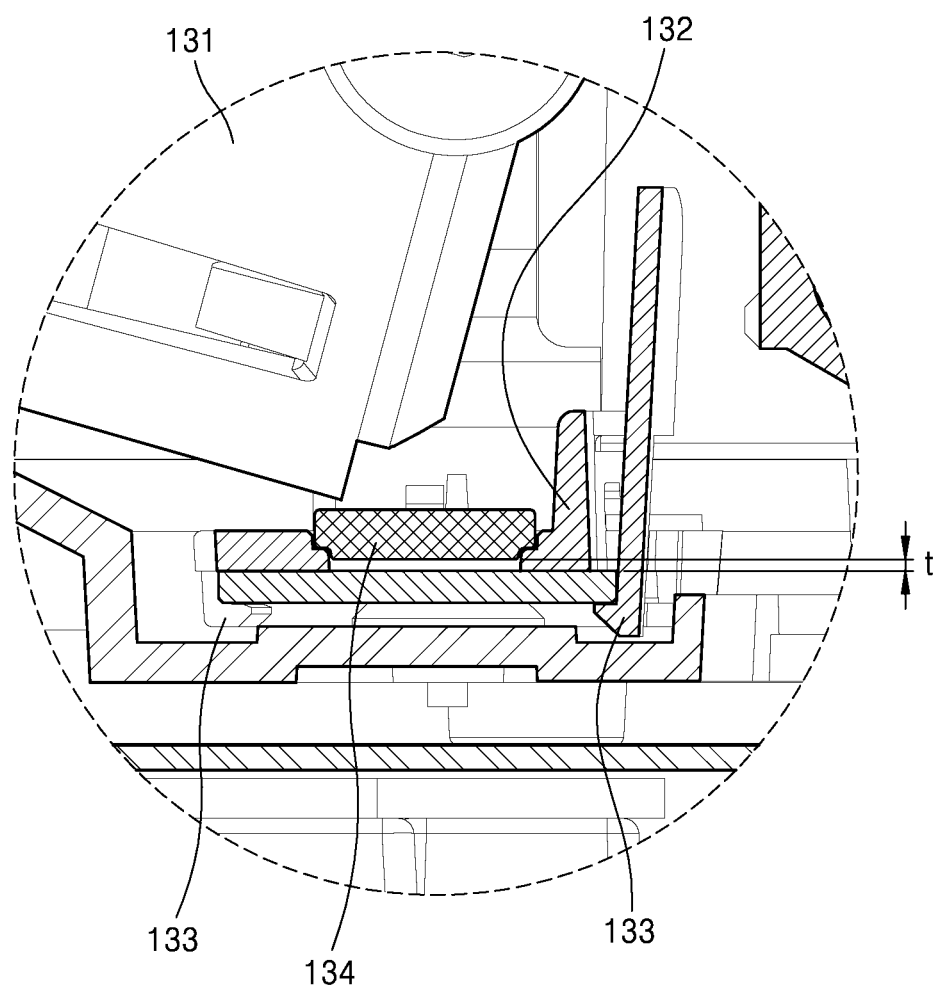
FIG. 6 is an enlarged view of a part A in FIG. 5, according to an exemplary embodiment.

The magnet 134 is spaced apart from a surface of the guide rail 120 and does not contact the guide rail 120. Referring to FIGS. 4 and 6, a predetermined interval t is provided between the magnet 134 and the guide rail 120. However, the inventive concept is not limited thereto, and a plurality of magnets 134 for the corresponding first camera lens units 130a may be arranged to have different intervals from one another.

Guide hooks 133 may be provided at opposite sides of the connector 132. The guide hook 133 is arranged on an outer portion of the connector 132 to surround the guide rail 120. That is, a side surface of the guide rail 120 is hooked by the guide hook 133, and thus, the connector 132 is guided to move along the guide rail 120.

FIG. 5 is a cross-sectional view of the surveillance camera assembly 100 of FIG. 1, and FIG. 6 is an enlarged view of a part A in FIG. 5, according to exemplary embodiments.

An installation structure of the guide rail 120 and the camera lens set 130 will be described below with reference to FIGS. 5 and 6.

A side of the first camera lens unit 130a is attached to the guide rail 120, and an opposite side of the first camera lens unit 130a is fixed by the fixing member 140.

The magnet 134 and the guide rail 120 are arranged in a first direction, e.g., the center axis direction of the base portion 110, and have attractive force in the first direction. As such, the first camera lens unit 130a is attached on the guide rail 120 and aligned.

The predetermined interval t may be maintained between the magnet 134 and the surface of the guide rail 120. That is, the magnet 134 does not contact the guide rail 120 due to the interval t. Since the magnet 134 does not contact the guide rail 120, the connector 132 may smoothly move on the guide rail 120.

In order to set the location of the first camera lens unit 130a, a user, who attaches and installs the first camera lens unit 130a on the guide rail 120, has to move the first camera lens unit 130a on the guide rail 120 to align the camera lens set 130.

When the magnet 134 contacts the surface of the guide rail 120, the attractive force between the magnet 134 and the guide rail 120 increases, and the magnet 134 may not move easily due to a frictional force between the surface of the magnet 134 and the surface of the guide rail 120. In this case, the first camera lens unit 130a does not easily move along the guide rail 120, and it is difficult for the user to install the camera lens set 130.

As described above, although the setting of the location by moving the camera lens set 130 is an essential operation for installing the surveillance camera assembly 100 including a plurality of lenses, an accuracy in setting the location of the camera lens set 130 degrades and a total working time increases when the magnet 134 contacts the guide rail 120.

According to the surveillance camera assembly 100 of the embodiment, since the magnet 134 is separated from the guide rail 120, relatively small attractive force is generated and the frictional force is not applied between the magnet 134 and the guide rail 120. That is, the attractive force between the magnet 134 and the guide rail 120 is enough for the camera lens set 130 to be attached to and not to be isolated from the guide rail 120, and the user may easily change the location of the camera lens set 130. Therefore, the user may easily set and align the camera lens unit 130.

The cover 150 pushes the fixing member 140 in the first direction to fix the location of the camera lens set 130. In particular, an internal side surface of the cover 150 pushes the fixing member 140 to fix the location of the camera lens set 130. Since the cover 150 supports the fixing member 140, the camera lens set 130 does not move along the guide rail 120.

Figure 7:
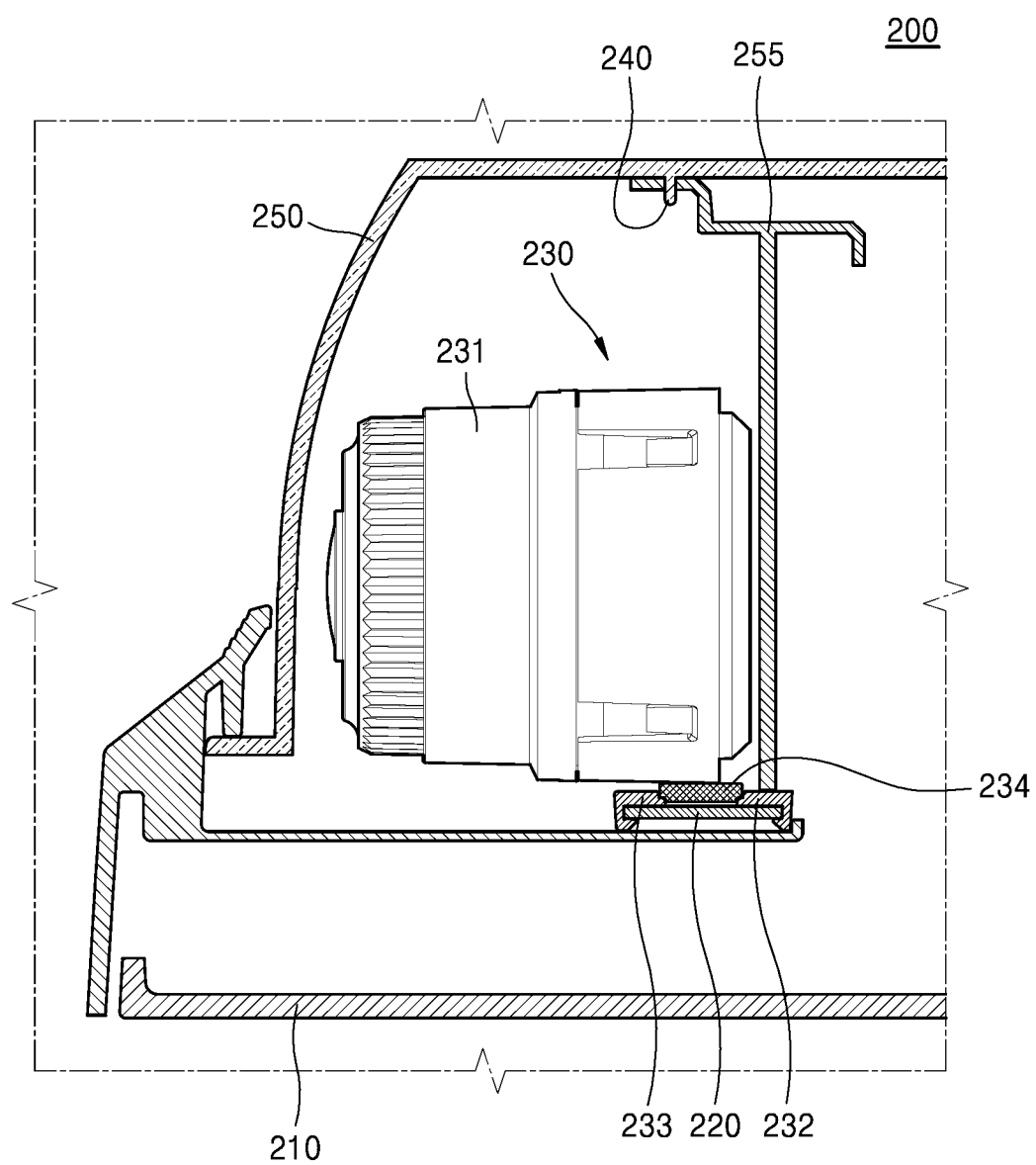
FIG. 7 is a cross-sectional view of a surveillance camera assembly according to an exemplary embodiment.

FIG. 7 is a cross-sectional view of a surveillance camera assembly 200 according to an exemplary embodiment.

Referring to FIG. 7, the surveillance camera assembly 200 may include a base portion 210, a guide rail 220, a camera lens unit 230, a fixing member 240, and a cover 250. A structure and a function of each element are the same as or similar to those of a corresponding element in the previous embodiment, and thus, detailed descriptions thereof are omitted. Hereinafter, a method of fixing the camera lens unit 230 and a structure of the camera lens unit 230 that is a main feature of the surveillance camera assembly 200 will be described below.

In the camera lens unit 230, a lens module 231 is connected to a connector 232, and a magnet 234 is provided in the connector 232. The connector 232 is attached facing the guide rail 220, and a guide hook 233 hooks a side surface of the guide rail 220 so that the connector 232 may move along the guide rail 220.

The connector 232 may be connected to a supporter 255 extending towards the cover 250. The supporter 255 may partition a camera lens unit arranged at a center and a camera lens unit arranged in a radial direction.

The supporter 255 is supported by the cover 250 to fix the location of the camera lens unit 230. The fixing member 240 of a protrusion type is formed on an inner circumferential surface of the cover 250, and may be inserted in a hole or a groove of the supporter 255. As a modified example, a hole or a groove may be formed in the inner circumferential surface of the cover 250, and the fixing member 240 of a protrusion type may be formed at a side of the supporter 255.

In the surveillance camera assembly 200, the cover 250 may directly support the camera lens unit 230 or support the supporter 255 at a rear end to fix the camera lens unit 230, without using a lens cover member surrounding the lens module 231.

Figure 8:
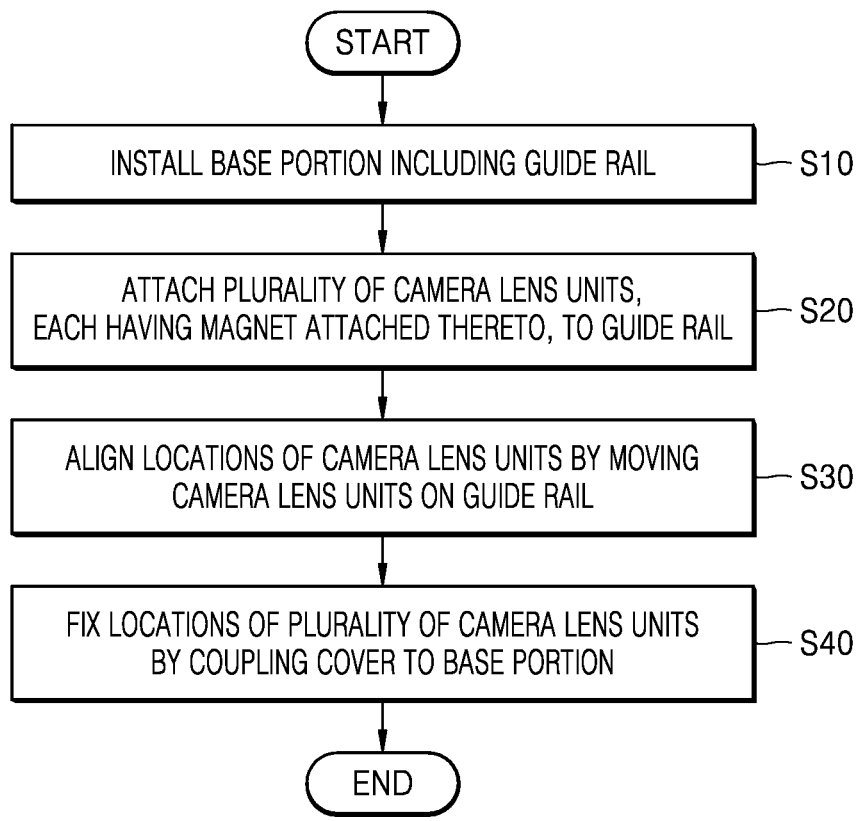
FIG. 8 is a flowchart illustrating a method of installing a surveillance camera assembly, according to an exemplary embodiment.

FIG. 8 is a flowchart illustrating a method of installing the surveillance camera assembly 100, according to an exemplary embodiment.

Referring to FIG. 8, the method of installing a surveillance camera assembly includes installing a base portion including a guide rail (S10), attaching a plurality of camera lens units, each having a magnet attached to a side thereof, to the guide rail (S20), aligning locations of the camera lens units by moving each of the camera lens units along the guide rail (S30), and fixing the locations of the camera lens units by coupling a cover to the base portion (S40).

In the process of installing the base portion including the guide rail (S10), an operator may fix the base portion to a ceiling or an outdoor structure. Also, the operator may simply fix the guide rail to the base portion.

In the process of attaching the camera lens units, each having a magnet attached to a side thereof, to the guide rail (S20), the operator may randomly attach the camera lens units to the guide rail. The camera lens units are placed on the guide rail, not aligned. After attaching the camera lens unit, the base portion may be fixed to an outer structure.

In the process of aligning the locations of the camera lens units by moving each camera lens unit along the guide rail (S30), the operator may align the locations of the camera lens units according to an installation environment of the surveillance camera assembly. The operator may force the camera lens units to move along the guide rail. The operator may align the locations of the camera lens units taking into account a field of view of the surveillance camera assembly.

In the process of fixing the locations of the camera lens units by coupling the cover to the base portion (S40), the operator may fix the locations of the camera lens units by coupling the cover to the base portion. When the operator assembles the cover with the base portion, the inner circumferential surface of the cover contacts the fixing member, and the fixing member pushes the camera lens units to fix the locations of the camera lens units. That is, the camera lens units do not move along the guide rail 120.

The surveillance camera having a plurality of lenses has to be installed to have various fields of view according to monitoring environment. That is, locations of lenses have to be set according to an environment where the surveillance camera is installed. In particular, in a case where the surveillance camera is attached to a ceiling, it takes a long time period for the user to align the camera lens due to gravity and the user has to look up the ceiling continuously. In order to reduce the difficulty in the installation, the locations of the camera lens have to be easily moved and aligned and the aligned locations have to be simply fixed.

The surveillance camera assembly according to the above embodiments may easily move on the guide rail via the magnet. In particular, the magnet is provided spaced apart from the surface of the guide rail, and thus, the user may easily move the camera lens units with a small force.

According to the surveillance camera assembly, the location of the camera lens units may be easily fixed by using the cover and the fixing member. The locations of the camera lens units may be simultaneously fixed only by fixing the cover on the base portion, and thus, convenience of the operation may be improved.

According to the surveillance camera assembly and the method of assembling the surveillance camera assembly of the above embodiments, the operator may easily set the location of the camera lens unit during the assembling process, and easily install the surveillance camera assembly according to the installation environment. In particular, the camera lens units may be aligned smoothly due to the interval between the magnet and the guide rail.

Also, according to the surveillance camera assembly and the method of assembling the surveillance camera assembly of the above embodiments, the location of the camera lens unit may be fixed by assembling the cover. The location of the camera lens unit may be fixed accurately by assembling the cover, without changing the location of the camera lens unit aligned by the user.

It should be understood that the embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A camera assembly comprising:
a base portion;
a guide rail mounted on the base portion;
a plurality of camera lens units arranged to be movable on or along the guide rail, each of the camera lens units comprising a magnet arranged to face the guide rail; and
a cover configured to fix positions of the camera lens units to the guide rail by pushing at least one of the camera lens units.

2. The camera assembly of claim 1, wherein, when the positions of the camera lens units are fixed on the guide rail, the magnet is spaced apart from a surface of the guide rail and the magnet does not contact the guide rail.

3. The camera assembly of claim 1, wherein the magnet generates attractive force of a degree to allow each of the camera lens units to move on or along the guide rail when an external force is applied to the camera lens unit, and a position of the camera lens unit is fixed when the cover is assembled with the base portion.

4. The camera assembly of claim 1, further comprising a fixing member disposed between at least one of the camera lens units and the cover.

5. The camera assembly of claim 4, wherein the fixing member is attached to each of the camera lens units, the fixing member comprising a cushion.

6. The camera assembly of claim 4, wherein, when the cover is assembled with the base portion, the fixing member is tightly positioned between the cover and the camera lens unit.

7. The camera assembly of claim 4, wherein the fixing member inwardly protrudes from the cover to be attached to the camera lens unit.

8. The camera assembly of claim 4, wherein the magnet and the guide rail are arranged in a first direction that is a center axis direction of the base portion to generate attractive force in the first direction, and the cover pushes the fixing member in the first direction.

9. The camera assembly of claim 1, wherein each of the camera lens units comprises:
a lens module;
a connector configured to allow the lens module to tilt and comprising the magnet; and
a guide hook arranged on an outer portion of the connector to surround the guide rail.

10. The camera assembly of claim 9, further comprising a fixing member arranged on the lens module, the connector, or a first lens cover surrounding the lens module.

11. The camera assembly of claim 9, wherein the magnet is provided to be depressed in a surface of the connector.

12. The camera assembly of claim 1, wherein camera lens units comprise:
at least one first camera unit arranged on or along the guide rail to have a field of view in a radial direction of a center axis of the base portion; and
a second camera unit arranged to have a field of view in a direction aligned or parallel with the center axis of the base portion,
wherein one of the first camera unit and the second camera unit is replaceable by the other.

13. The camera assembly of claim 12, wherein the second camera unit is not arranged on or along the guide rail.

14. A camera assembly comprising:
a base portion;
a guide rail mounted on the base portion;
a camera lens unit arranged to be moveable on or along the guide rail;
a magnet provided in the camera lens unit to maintain a predetermined interval between the magnet and a surface of the guide rail;
a cover coupled to the base portion and surrounding the camera lens unit; and
a guide hook arranged in the camera lens unit to surround the guide rail.

15. The camera assembly of claim 14, wherein the cover is configured to fix a position of the camera lens unit to the guide rail by pushing a side of the camera lens unit.

16. The camera assembly of claim 14, further comprising a fixing member disposed between the cover and the camera lens unit.

17. The camera assembly of claim 14, wherein the magnet generates attractive force of a degree to allow the camera lens unit to move on or along the guide rail when an external force is applied to the camera lens unit, and a position of the camera lens unit is fixed when the cover is assembled with the base portion.

18. A method of installing a camera assembly, the method comprising:
- installing a base portion including a guide rail;
- attaching a plurality of camera lens units, each having a magnet attached to thereof, to the guide rail;
- aligning positions of the camera lens units by moving each of the plurality of camera lens units on or along the guide rail; and
- fixing the positions of the camera lens units by coupling a cover to the base portion.

19. The method of claim 18, wherein, in the aligning the positions of the plurality of camera lens units, the magnet and the guide rail generate attractive force therebetween to allow the camera lens unit to move on or along the guide rail when an external force is applied to at least one of the camera lens units.

* * * * *